US010889285B2

(12) United States Patent
Secrest

(10) Patent No.: US 10,889,285 B2
(45) Date of Patent: Jan. 12, 2021

(54) CONTROL OF AC ELECTRIC MACHINE USING AVERAGE SYNCHRONOUS FRAME CURRENTS

(71) Applicant: GM Global Technology Operations LLC, Detroit, MI (US)

(72) Inventor: Caleb W. Secrest, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 171 days.

(21) Appl. No.: 16/266,799

(22) Filed: Feb. 4, 2019

(65) Prior Publication Data
US 2020/0247389 A1   Aug. 6, 2020

(51) Int. Cl.
| B60W 20/10 | (2016.01) |
| B60W 10/06 | (2006.01) |
| B60K 6/365 | (2007.10) |
| B60W 50/04 | (2006.01) |
| B60K 6/26 | (2007.10) |
| B60W 10/08 | (2006.01) |

(52) U.S. Cl.
CPC .............. *B60W 20/10* (2013.01); *B60K 6/26* (2013.01); *B60K 6/365* (2013.01); *B60W 10/06* (2013.01); *B60W 10/08* (2013.01); *B60W 50/04* (2013.01)

(58) Field of Classification Search
CPC ...... B60W 20/10; B60W 10/06; B60W 10/08; B60W 50/04; B60K 6/26; B60K 6/365
See application file for complete search history.

(56) References Cited

U.S. PATENT DOCUMENTS

| 2005/0093520 A1* | 5/2005 | Muramatsu | H02K 11/33 322/29 |
| 2008/0179889 A1* | 7/2008 | Matsui | H02J 7/1492 290/36 R |
| 2011/0279071 A1* | 11/2011 | Yamada | H02P 27/08 318/400.02 |
| 2017/0005493 A1* | 1/2017 | Seo | B60L 58/21 |
| 2018/0138845 A1* | 5/2018 | Tamura | H02P 21/22 |
| 2019/0084426 A1* | 3/2019 | Tanaka | H02P 21/22 |
| 2019/0285702 A1* | 9/2019 | Tashiro | G01R 31/392 |

\* cited by examiner

*Primary Examiner* — Hussein Elchanti
(74) *Attorney, Agent, or Firm* — Quinn IP Law

(57) ABSTRACT

A method for controlling an electric machine in a powertrain system in which a driven load is connected to a rotor of the electric machine includes measuring phase currents at a starting point of a sample period using current sensors connected to phase windings of the electric machine. The individual phase currents also are determined at a midpoint of the previous sample period. An angular position of the rotor is determined at the starting point and previous midpoint before calculating synchronous reference frame currents of the electric machine at the starting and previous midpoint using the phase currents and angular position. The method includes calculating average synchronous reference frame currents over the sample period and regulating operation of the electric machine using the average. An electrical system includes the electric machine, a power inverter module, and a controller that executes the method.

20 Claims, 5 Drawing Sheets

CONTROL OF AC ELECTRIC MACHINE USING AVERAGE SYNCHRONOUS FRAME CURRENTS

INTRODUCTION

Electric machines such as traction motor or motor/generator units are used in a wide variety of powertrain systems to generate and deliver motor torque to a driven load. In some configurations, permanent magnets are attached to or disposed within laminations of a rotor, surrounded by a stator, and coupled to the driven load. An electromagnet is formed by winding lengths of copper wire or bar conductors within individual slots of the stator, such that the stator windings, when energized by a power supply, will generate an electromagnetic field having an alternating polarity.

The resultant push-pull forces of the interacting rotor and stator fields causes the rotor to rotate about its axis, which ultimately powers the driven load coupled to the rotor, e.g., via an intervening set of planetary gear sets. The identity of the driven load varies with the intended application of the electric machine. Common electrically-driven loads include, by way of example, road wheels or drive belts of a motor vehicle, as well as propeller shafts, conveyor systems, and hoists, with the torque and speed of the electric machine being varied in an application-specific manner for these and other exemplary driven loads.

A proportional-integral controller may be used to regulate output torque and speed of an electric machine. Machine control is typically achieved using independent current control loops for a synchronous reference frame, with the synchronous reference frame defined by a direct-axis (d-axis) and a quadrature-axis (q-axis). As used in the art of electric machine control, the d-axis current and voltage are specific control parameters that are purposefully varied in real-time to regulate a level of magnetizing flux in the stator, while the q-axis current and voltage are independently controlled in order to regulate output torque and/or speed of the electric machine.

The above-noted synchronous reference frame axes, which are together referred to as the dq-axes, form a continuously rotating frame of reference for machine control. The control effects of continuous frame rotation are typically ignored in existing motor control schemes. However, the synchronous reference frame currents, i.e., the above-noted d-axis and q-axis currents, are not constant over a full duration of a given sample period. The lack of constancy may result in real-time machine parameter estimation errors, or errors in characterization of such parameters, particularly in the areas of flux-linkage, alternating current resistance, and core loss estimation. Errors of these types may ultimately lead to torque production error and other undesirable effects.

SUMMARY

A method and accompanying system of the present disclosure are intended to help avoid undesirable performance degradation in the overall control of an electrical circuit having an electric machine, particularly a polyphase/alternating current (AC) electric machine as described herein. In addition to the electric machine, the electrical circuit may include a multi-cell direct current (DC) battery pack, a power inverter module (PIM) connecting the electric machine to the DC battery pack, and a controller. The disclosed method is embodied as a computer-executable algorithm that is used in real-time to calculate and control the average synchronous frame currents (i.e., the d-axis and q-axis currents) of the electric machine over a given sample period, with the sample period possibly corresponding to a pulse width modulation (PWM) interval of the PIM.

In general, the present approach samples the individual phase currents of the electric machine twice per sample period, including mid-sample, and extrapolates a mid-sample position of the above-noted synchronous reference frame. The sampled values and the extrapolated mid-sample position are then used to calculate or otherwise determine average synchronous frame currents of the electric machine. Thereafter, the average synchronous frame currents are controlled to regulate torque and/or speed operation of the electric machine, which may include controlling operation of a powertrain system in which the electric circuit is employed.

A particular embodiment of the method for controlling the polyphase electric machine includes measuring the phase currents of the electric machine at a starting point of a present sample period, using a set of current sensors, and also determining the phase currents at a midpoint of a prior sample period. As used herein, the term "prior sample period" describes the sample period occurring immediately prior to the present sample period. The method includes determining, via a controller, a position of a synchronous reference frame of the electric machine at the starting point and the midpoint. The synchronous reference frame currents of the electric machine are then calculated at the starting point and midpoint, via the controller, using the phase currents and the synchronous reference frame position. Thereafter, the method continues by calculating the average synchronous reference frame currents over a duration of the present sample period using the present and midpoint synchronous reference frame currents. As part of the disclosed example embodiment, the method may include regulating torque and/or speed of the electric machine via the controller using the calculated average synchronous reference frame currents.

Determining the phase currents at the midpoint of the prior sample period may include measuring the phase currents via the current sensors or extrapolating the phase currents via the controller.

Calculating the average synchronous reference frame currents over a duration of the present sample period may include determining the average synchronous reference frame currents at a present or a future instant in time using a current observer of the controller. In such an embodiment, calculating the average synchronous reference frame currents may include extrapolating the average synchronous reference frame currents at the future instant in time using the average synchronous reference frame currents at the present and/or a past instant in time. Extrapolating the average synchronous reference frame currents at the future instant in time may be accomplished by the controller using linear extrapolation, or via a second order or higher-order extrapolation.

The method in some embodiments may include determining a difference between the average synchronous reference frame currents and instantaneously-sampled synchronous frame currents for the present sample period or the prior sample period, processing the difference through a low-pass filter to produce a filtered difference, and adjusting a set of synchronous reference frame current commands to the electric machine, via the controller in real-time, using the filtered difference.

The electric machine may have a rotor coupled to road wheels of a motor vehicle. Regulating torque or speed of the electric machine in such an embodiment includes controlling a corresponding torque or speed of the road wheels.

In some configurations, the controller may register or assume in logic that the synchronous reference frame currents are shaped as a rectified sine wave between concurrent samples. Calculating the average synchronous reference frame currents over a duration of the present sample period may then include solving the following equations:

$$I_{x,pk1} = \frac{[I_x(k) + I_x(k-1)]}{2}$$

$$I_{x,pk-pk} = [I_{x,pk1} - I_x(k-0.5)]$$

$$I_{x,avg} = I_{x,pk1} - \frac{2I_{x,pk-pk}}{\pi}$$

where $I_{x,avg}$ is the average synchronous reference frame currents, Ix(k), Ix(k−0.5), and Ix(k−1) are the synchronous reference frame currents at times (k), (k−0.5), and (k−1), and wherein time (k) is the present sample, time (k−0.5) is the midpoint sample, and (k−1) is the prior sample.

An electrical system is also disclosed herein that has an alternating current (AC), polyphase electric machine with phase windings and a rotor. The electrical system also includes a power inverter module (PIM) connected to a battery pack and phase windings, and configured, responsive to pulse width modulation signals, to output an AC voltage to the phase windings to energize the polyphase electric machine. Current sensors measure phase currents of the electric machine. In this embodiment, a controller receives measured phase currents from the current sensors at a starting point of a present sample period, and determines the phase currents at a midpoint of a prior sample period, with the prior sample period occurring immediately prior to the present sample period.

The controller also determines the synchronous reference frame position at the starting point and midpoint, calculates synchronous reference frame currents of the electric machine at the starting point and midpoint using the measured phase currents and the synchronous reference frame position, and calculates average synchronous reference frame currents over a duration of the present sample period using the synchronous reference frame currents at the starting point and midpoint. Thereafter, the controller regulates operation of the electric machine using the average synchronous reference frame currents.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
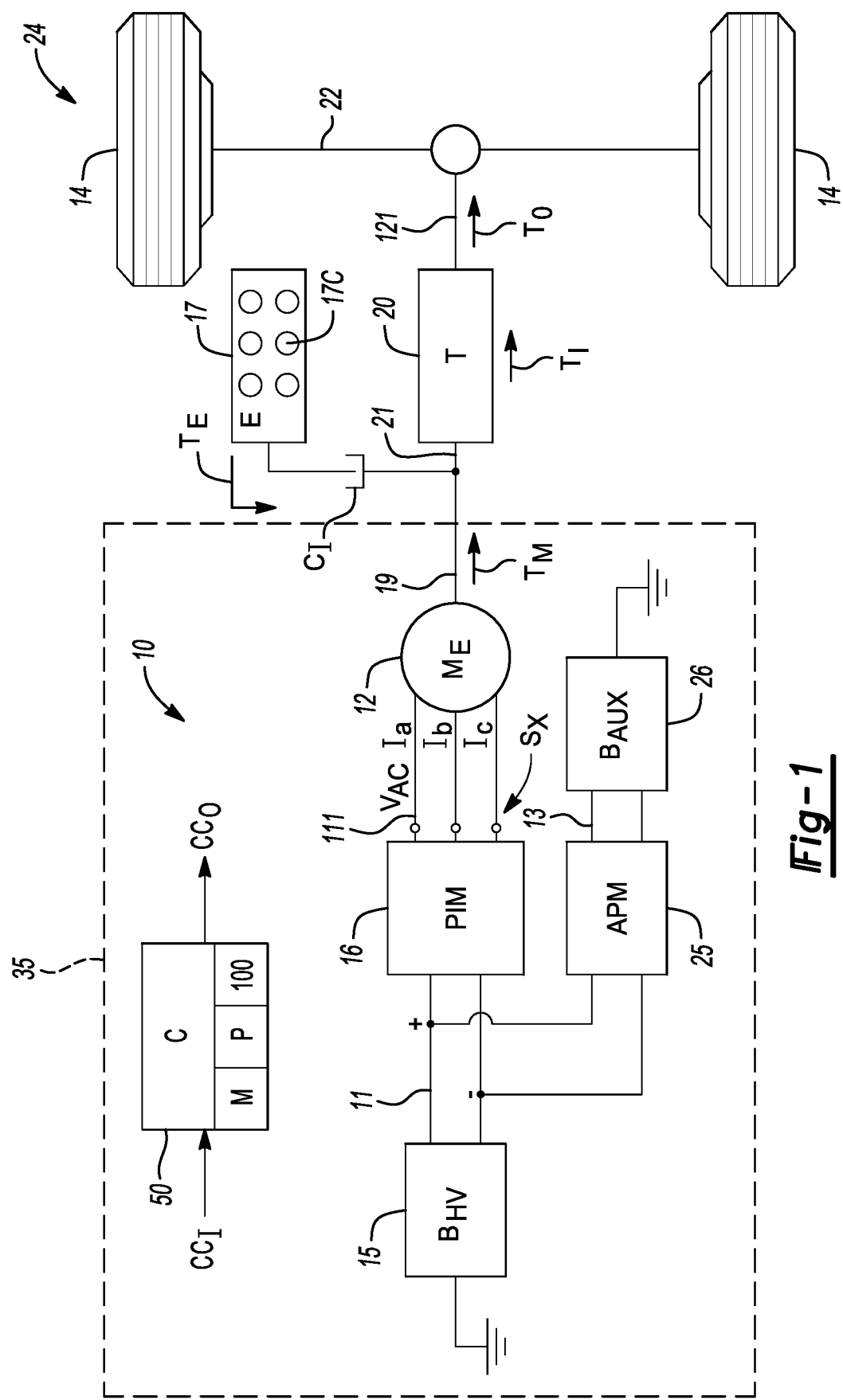
FIG. 1 is a schematic illustration of an example powertrain system having an electric circuit that includes an electric machine and a controller, with the controller configured to sample and control the average synchronous frame currents of the electric machine according to the present method.

The present disclosure is susceptible to various modifications and alternative forms, and some representative embodiments have been shown by way of example in the drawings and will be described in detail herein. However, novel aspects of the disclosure are not limited to the particular forms illustrated in the appended drawings. Rather, the disclosure is to cover modifications, equivalents, combinations, and/or alternatives falling within the scope of the disclosure as defined by the appended claims.

DETAILED DESCRIPTION

Referring to the drawings, wherein like reference numbers refer to the same or like components in the several Figures, an example powertrain system 10 includes an electrical system 35 having an electric machine (ME) 12. The electric machine 12 is depicted as an electric traction motor for an example motor vehicle 24, and will be described hereinafter in this context for illustrative consistency. However, the electric machine 12 may be used in wide variety of applications, including rail vehicles/trains, aircraft, marine vessels, mobile platforms, or robotic systems, as well as in stationary power plants, hoists, or drive systems. Regardless of the particular system in which the electric machine 12 is ultimately put to beneficial use, output torque and speed of the electric machine 12 are controlled via a method 100, with the code embodying the present method 100 being executable in real-time via a proportional-integral controller (C) 50.

As will be described in detail below with reference to FIGS. 2A-6, the controller 50 is configured to calculate and control the average synchronous reference frame (stator) currents, i.e., the above-noted d-axis and q-axis stator currents, of the electric machine 12, with the controller 50 doing so over a calibrated sample period. The sample period may coincide with a duration of a pulse width modulation (PWM) interval used for controlling the electric machine 12 via a connected power inverter module (PIM) 16.

When executing the method 100, the controller 50 automatically samples/measures individual phase currents of the electric machine 12, with three measured phase currents $I_a$, $I_b$, and $I_c$ shown in FIG. 1 in an exemplary three-phase embodiment of the electric machine 12. Current sensors (Sx) located on or with respect to at least two of the three exemplary phase leads measure the phase currents ($I_a$, $I_b$, and $I_c$), with a pair of the current sensors (Sx) possibly used to measure two of the three phase currents in such an example, with the controller 50 calculating the third phase current.

A given sample period as used herein has a starting point that coincides with an ending point of an immediately-prior sample period. The controller 50 samples the phase currents twice per calibrated sample period. In the middle of each sample period, the controller 50 samples or extrapolates a synchronous reference frame position. Depending on the configuration of the electric machine 12, the synchronous reference frame position may or may not be tied to the angular position of a rotor 19 of the electric machine 12. For an induction machine, for instance, the synchronous reference frame position is not tied to the rotor's position, while the rotor's angular position and the synchronous frame position may coincide for a permanent magnet machine. A position sensor ($S_P$), such as a rotary encoder or other suitable sensor, may be used to measure the angular position of the rotor 19 as part of a set of input signals (arrow $CC_I$), with the controller 50 converting the angular position to the synchronous reference frame position used herein. Between samples or extrapolations of the above-noted synchronous reference frame position, the controller 50 derives and then controls the average synchronous frame currents, with such a control action occurring in lieu of control of the instantaneously-sampled synchronous frame currents.

In the example powertrain system 10 shown in FIG. 1, an optional internal combustion engine (E) 17 has a set of engine cylinders 17C, e.g., four, six, eight, or more cylinders 17C. Reciprocating pistons (not shown) are disposed within the engine cylinders 17C, with a fuel combustion process ultimately generating engine torque (arrow $T_E$) that is fed into the powertrain system 10. The engine torque (arrow $T_E$) may be delivered across an input clutch ($C_I$), e.g., a rotating clutch or hydrodynamic torque converter assembly, to an input member 21 of a transmission (T) 20. An output member 121 of the transmission 20 carries transmission output torque (arrow $T_O$) to one or more drive axles 22 in the illustrated example embodiment of the motor vehicle 24, with the drive axles 22 coupled to a set of drive wheels 14 in the non-limiting example embodiment of FIG. 1, or to another driven load in other applications of the electric machine.

Within the powertrain system 10, the electrical system 35 also includes a propulsion battery pack ($B_{HV}$) 15. The battery pack 15 may be embodied as a multi-cell direct current (DC) power supply, with the subscript "HV" in FIG. 1 indicating "high-voltage", i.e., voltage levels sufficient for energizing the electric machine 12 sufficiently for rotating the rotor 19. The battery pack 15 is electrically connected to the above-noted PIM 16 via positive (+) and negative (−) bus rails of a high-voltage DC voltage bus 11. The PIM 16 may be controlled using PWM voltage control signals from the controller 50 or another control unit to output an alternating current voltage ($V_{AC}$) via a corresponding high-voltage AC voltage bus 111.

Individual phase leads or windings of the electric machine 12 are energized via the AC voltage bus 111 to thereby generate motor output torque (arrow $T_M$). The motor output torque (arrow $T_M$) is transmitted to the transmission 20 via the rotor 19 alone or with the engine torque (arrow $T_E$) to provide an input torque (arrow $T_I$) to the transmission 20. An auxiliary power module (APM) 25 in the form of a DC-DC converter may be connected to the high-voltage bus 11 and configured to selectively output a low/auxiliary voltage via an auxiliary voltage bus 13. An auxiliary battery ($B_{AUX}$) 26 such as a 12V lead acid battery may be connected to the auxiliary voltage bus 13 and configured to serve as an auxiliary power supply within the powertrain system 10.

In order to perform the method 100 as described below, the controller 50 is programmed to receive the input signals (arrow $CC_I$) from the powertrain system 10 in real-time, with the controller 50 equipped with a processor (P) and sufficient amounts and types of memory (M). The memory (M) may include tangible, non-transitory memory, e.g., read only optical, magnetic, and/or flash memory, etc. The controller 50 also includes sufficient amounts of random-access memory, electrically-erasable programmable read only memory, and the like, as well as a high-speed clock and counter, analog-to-digital and digital-to-analog circuitry, and input/output circuitry and devices, as the method 100 enables the controller 50 to automatically generate and transmit output signals (arrow $CC_O$) to the powertrain system 10 and/or electrical circuit 35 to control operation of the powertrain system 10 and/or the electric machine 12 as needed, with the output signals (arrow $CC_O$) also encompassing the above-noted PWM control signals in some embodiments.

Figure 2A:
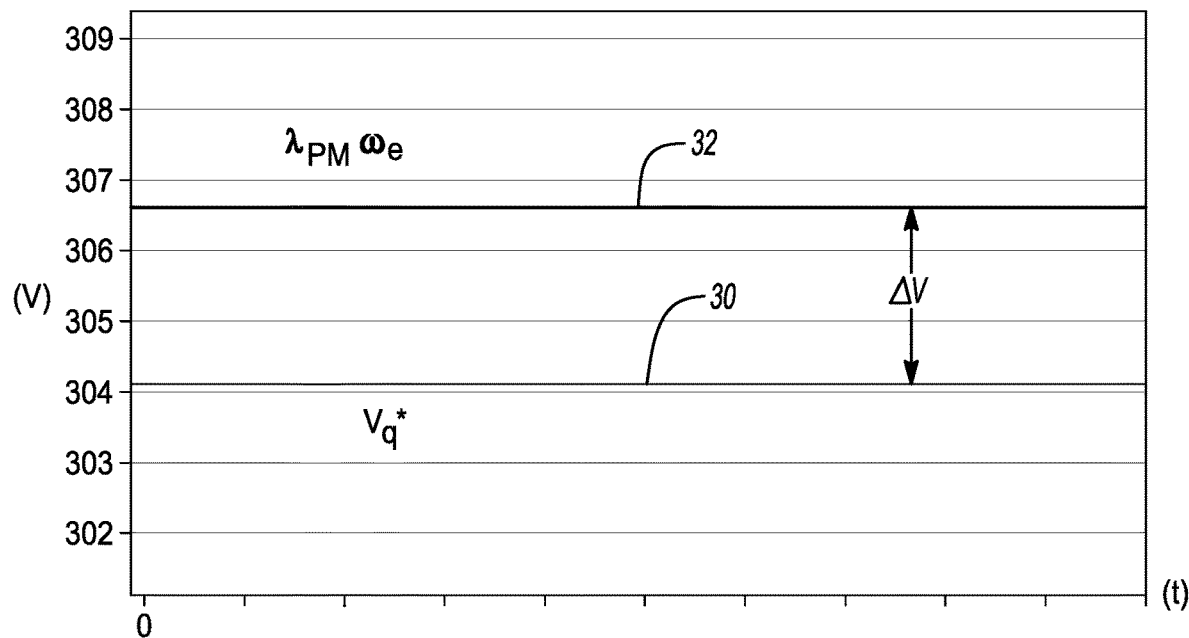
FIGS. 2A and 2B are schematic illustrations of simulated voltage error and current sampling error, respectively, corrected using the disclosed method.
Figure 2B:
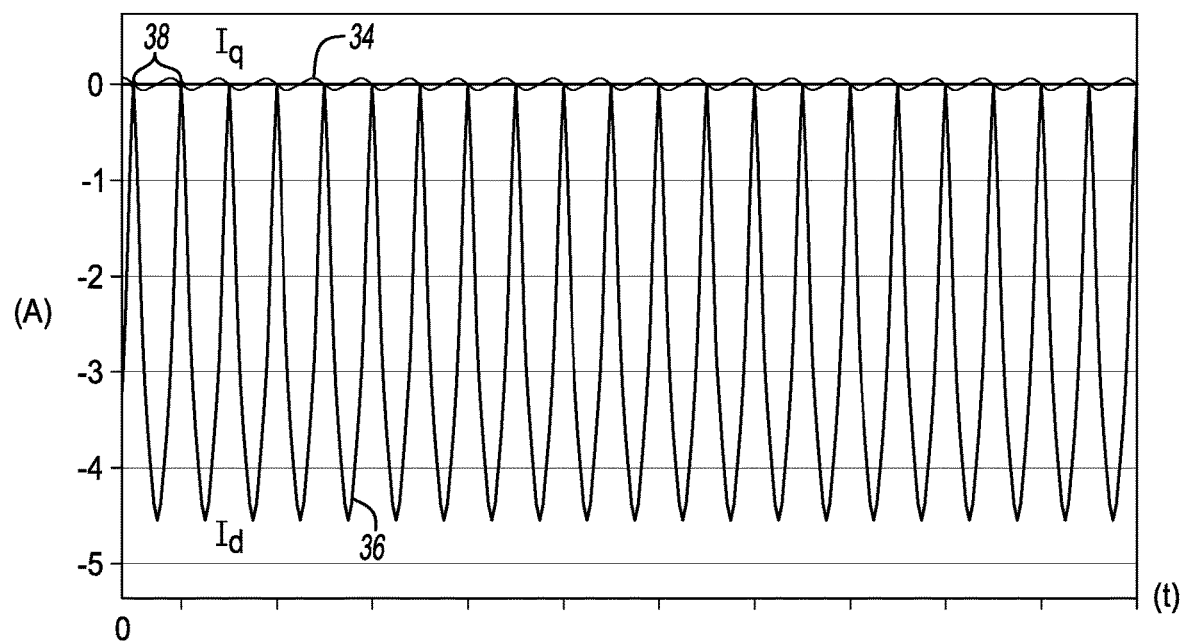

FIGS. 2A and 2B correspond to a simulation of a current-regulated system in which the commanded d-axis and q-axis currents are zero, i.e., $I_d^*=I_q^*=0$. Under this condition, a q-axis voltage command ($V_q^*$) calculated by the controller 50, shown as trace 30, should be equal to the back-electromotive force, $\lambda_{PM}\omega_e$, with $\lambda_{PM}\omega_e$ represented by trace 32. Also, $\lambda_{PM}$ represents the permanent magnet flux in the electric machine 12 and $\omega_e$ is the rotational speed of the synchronous reference frame. However, the average current is actually non-zero over a given calibrated sample period, as illustrated in FIG. 2B. As a result, a current regulator 54 (see FIGS. 5 and 6) makes up for current sampling error, and applies a corrective voltage. In other words, the current sampling error appears as a disturbance to the current regulator 54.

To demonstrate such possible error, a representative voltage difference ($\Delta V$) is shown in FIG. 2A between traces 30 and 32, with voltage (V) depicted on the vertical axis. Time (t) is depicted in milliseconds, with the indicated time scale and amplitudes of FIGS. 2A and 2B being illustrative and non-limiting. A cause of such error is depicted in FIG. 2B which illustrates the q-axis current ($I_q$) in amps (A) as trace 34 and the d-axis current ($I_d$) as trace 36. The values collected at discrete sample points 38 at intersections of traces 34 and 36, e.g., by analog-to-digital control logic of the controller 50, correspond to zero in the synchronous frame at the instant of sampling. However, the sampled values do not reflect the average synchronous frame currents over a full sample period between consecutive sample points 38. The method 100 is intended to address this problem in the powertrain system 10 of FIG. 1 or other systems using the electric machine 12.

Figure 3:
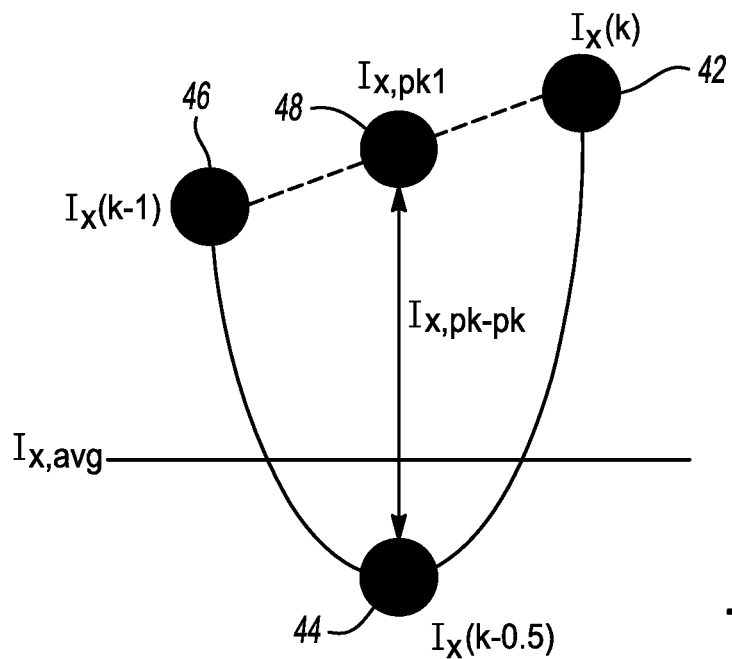
FIG. 3 is a plot of the present method for calculating average synchronous frame currents.
Figure 4:
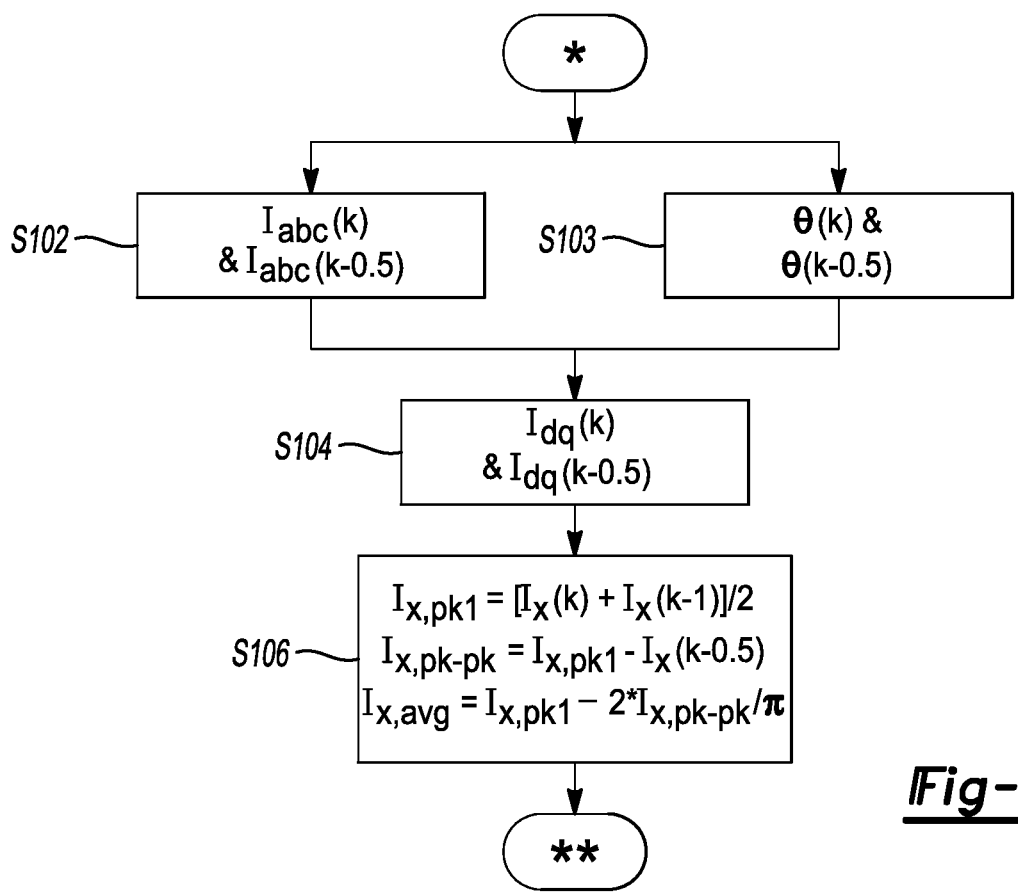
FIG. 4 is a flow chart describing an example embodiment of the present method.

Referring to FIGS. 3 and 4, the present method 100 proceeds by registering or assuming in logic of the controller 50 that the synchronous reference frame currents both have the shape of a rectified sine wave between consecutive samples. Upon initialization (*), the controller 50 proceeds to step S102 of FIG. 4 and samples/measures the individual phase currents of the electric machine 12 using the current sensors ($S_X$) shown in FIG. 1. In the exemplary three-phase embodiment of the electric machine 12 of FIG. 1, for instance, the phase currents ($I_a$, $I_b$, and $I_c$) are collected. The controller 50 may do this over a calibrated sampling interval (k), with (k) being the present time point, and also at a midpoint (k−0.5) of the sampling interval, with (k) being nominally equal to 1 for illustrative simplicity and "0.5" meaning half of the sampling interval, regardless of the actual duration thereof.

At the same time in step S103 of FIG. 4, the controller 50 may measure or sample the angular position of the rotor 19 using the position sensor ($S_P$), and may then convert the angular position to synchronous reference frame position ($\theta_e$). When the electric machine 21 is a permanent magnet machine, step S103 may entail multiplying the measured angular position ($\theta_r$) of the rotor 19 by the number (N) of pole pairs of the electric machine 21, i.e.:

$\theta_e = \theta_r N$.

When the electric machine 21 is an induction machine, the conversion may include solving the following equation:

$$\omega_e = \omega_r + r_r L_{rat} \frac{i_{qs}}{\lambda_{dr}}$$

where $\omega_r$ is the mechanical speed of the rotor 19 multiplied by the number of pole pairs, $R_r$ is the electrical resistance of the rotor 19, $L_{rat}$ is the inductance ratio, i.e., the ratio of magnetizing inductance to rotor inductance, $i_{qs}$ is the d-axis current, and $\lambda_{dr}$ is the d-axis rotor flux. The synchronous frame position, $\theta_e$, is the determined by integration of the synchronous speed $\omega_e$.

The controller 50 also samples or estimates the synchronous reference frame position θ(k−0.5) at a midpoint of the sample interval, with "k−0.5" representing such a midpoint. The controller 50 thus determines θ(k) and θ(k−0.5). The latter value may be extrapolated by the controller 50 based on the measured or calculated rotational speed of the rotor 19 and one or more prior-collected angular values, for instance. The controller 50 temporarily saves the results of steps S102 and S103 and proceeds to step S104.

At step S104 of FIG. 4, the controller 50 calculates the synchronous reference frame currents at the present instant in time (k), i.e., at a starting point of the present sample period, and also at a midpoint of the immediately-prior occurring sample period (k−0.5). Such values correspond to points 42 and 44 for the synchronous frame currents $I_x(k)$ and $I_x(k-0.5)$ in FIG. 3, where the subscript "x" used in FIG. 3 for simplicity represents the d and q axes, i.e., the method 100 is performed for both axes. Since the process is continuous, the controller 50 of FIG. 1 has in its memory (M) a buffer of past values, with the synchronous reference frame currents for the immediately-prior sample period $I_x(k-1)$ also shown as point 46 in FIG. 3.

Step S106 of FIG. 4 includes calculating the average current, i.e., $I_{x,avg}$, for the synchronous reference frame (both the d-axis and the q-axis). The controller 50 may optionally use the following equations for this purpose:

$$I_{x,pk1} = \frac{[I_x(k) + I_x(k-1)]}{2}$$

$$I_{x,pk-pk} = [I_{x,pk1} - I_x(k-0.5)]$$

$$I_{x,avg} = I_{x,pk1} - \frac{2 I_{x,pk-pk}}{\pi}$$

with the resultant value, $I_{x,avg}$, shown in FIG. 3, and $I_{x,pk1}$ shown as point 48.

Figure 5:
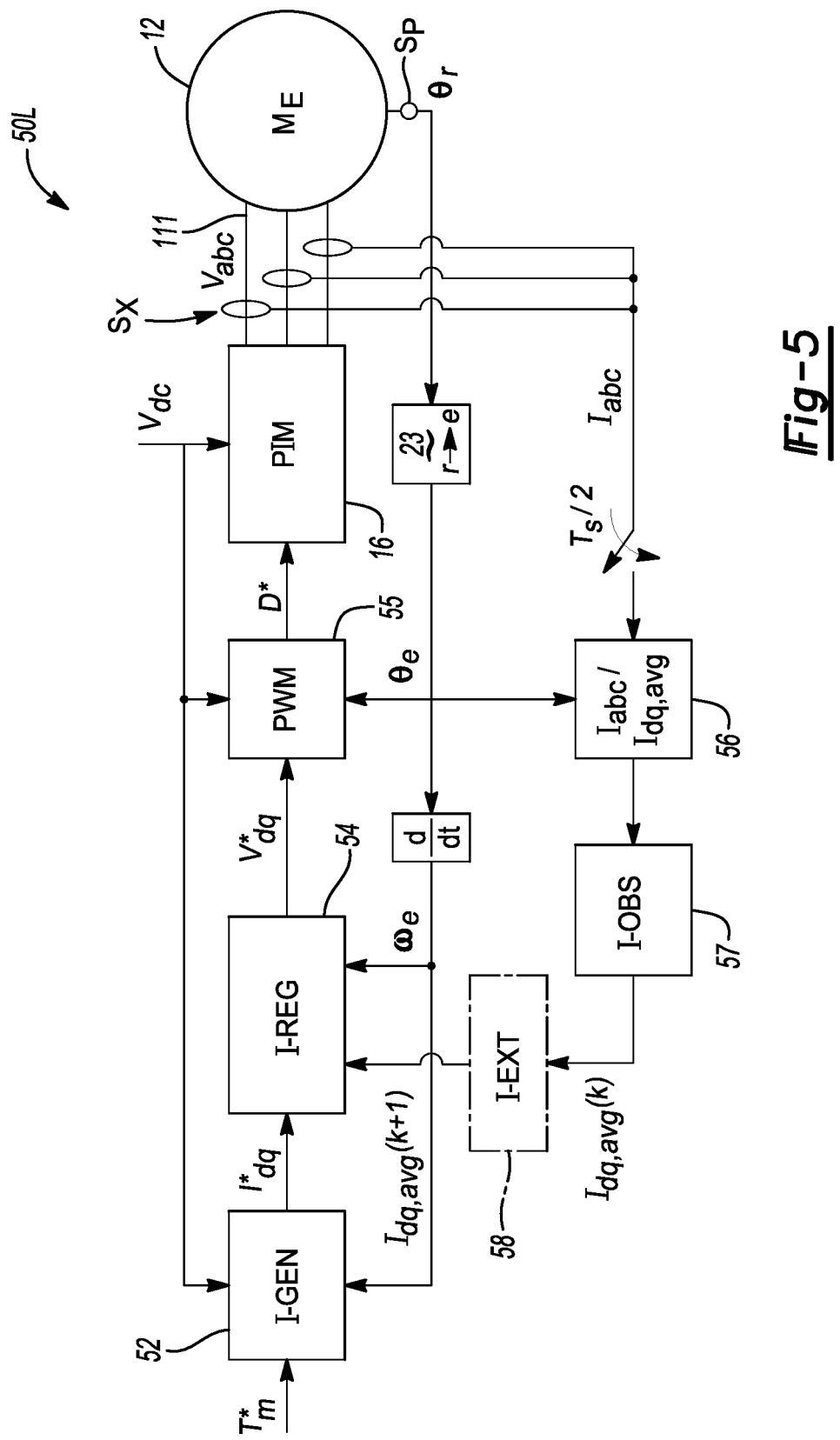
FIGS. 5 and 6 are schematic control diagrams of possible implementations of the method in control logic of the controller shown in FIG. 1.
Figure 6:
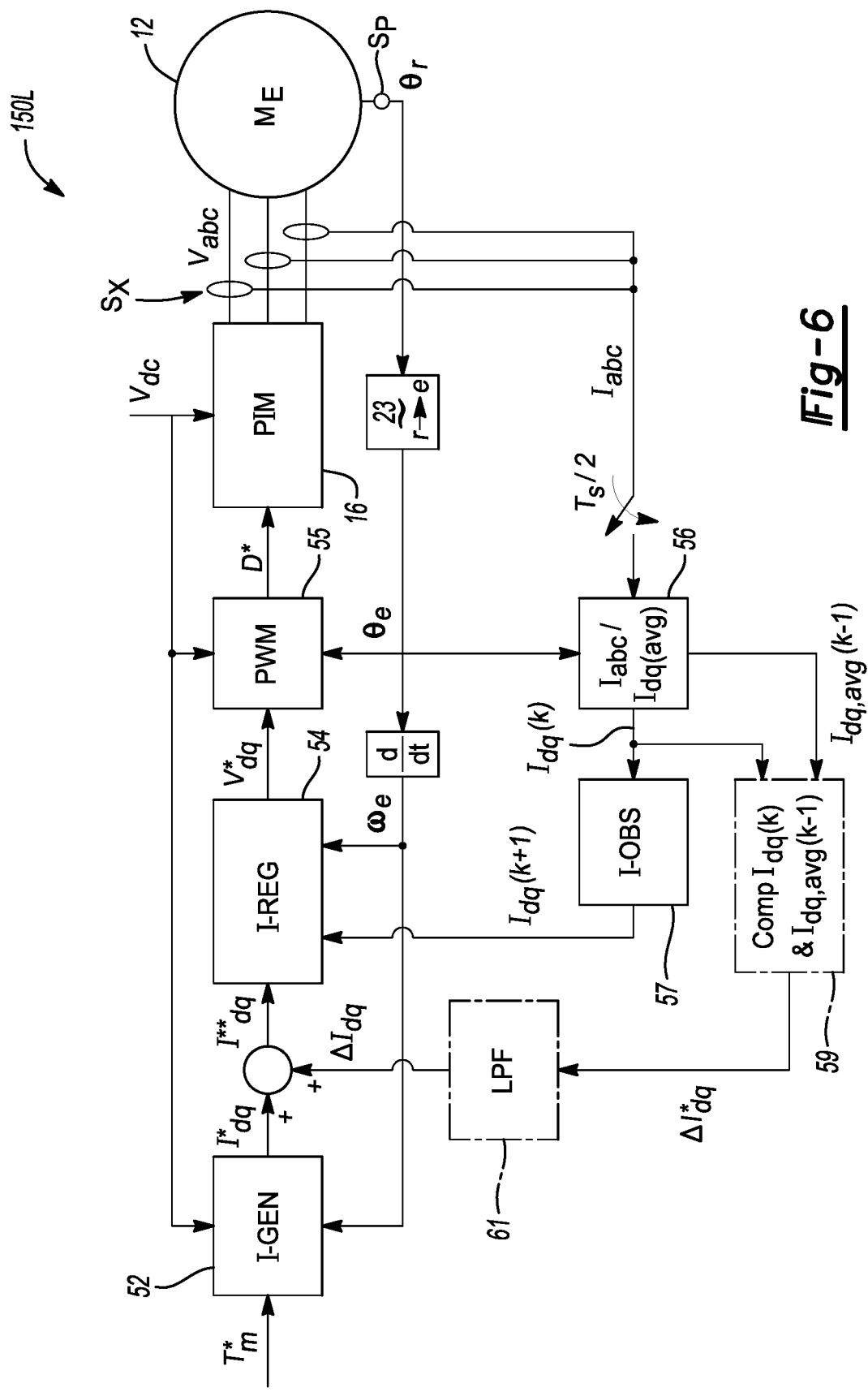

FIGS. 5 and 6 depict possible implementations of the method 100 in control logic of the controller 50. In FIG. 5, example control logic 50L is used to feed a motor torque command ($T^*_m$) for the electric machine 12 into a current command generation (I-GEN) logic block 52. The output of logic block 52, i.e., the commanded dq axes synchronous frame currents ($I^*_{dq}$), are fed into a current regulator (I-REG) 54 along with other values as disclosed below. The current regulator block 54 ultimately outputs a required voltage ($V^*_{dq}$) to a PWM strategy logic block 55, which in turn provides a PWM voltage signal (D*) to the PIM 16.

The PIM 16, as noted above with reference to FIG. 1, receives a DC voltage (arrow Vdc) from the battery pack 15 and outputs the individual phase currents ($I_a$, $I_b$, and $I_c$) to the electric machine 12. Position sensor ($S_P$) measures the angular position ($\theta_r$) of the electric machine 12, i.e., its rotor 19 (see FIG. 1), and feeds this measurement into a conversion block 23. Conversion block 23 outputs the synchronous reference frame position ($\theta_e$) noted above. The current sensors (Sx) disposed on at least two of the three exemplary phases leads measure the phase currents ($I_a$, $I_b$, and $I_c$), with two current sensors ($S_X$) possibly used to measure two of the three phase currents in this example and the controller 50 calculating the remaining phase current. The controller 50 transmits the measurements to a calculation logic block 56 every half sample ($T_s/2$), with (Ts) being the calibrated sample period time. The calculation logic block 56 converts the sampled phase currents ($I_a$, $I_b$, $I_c$) to corresponding d-axis and q-axis average currents, i.e., $I_{d,avg}(k-1)$ and $I_{q,avg}(k-1)$, respectively. Thus, logic block 56 generally corresponds to FIG. 4. A current observer (I-OBS) 57 is then used to derive the average synchronous frame currents at the present point in time (k), i.e., $I_{dq,avg}(k)$.

The value of $I_{dq,avg}(k)$ may be transmitted to the current regulator 54 as an input thereto, with use of the current observer 57 eliminating delay in the feedback path. That is, absent the current observer 57, using average current over a previous sample period introduces one additional sample period of delay in the current regulator feedback loop, which is eliminated using the current observer 57. Ideally, however, the controller 50 is provided with knowledge of the average synchronous frame currents for a future time point (k+1) for an immediately-subsequent sample, i.e., $I_{dq,avg}(k+1)$, as feedback in order to cancel out an inherent delay that exists in the PWM block 55.

Optionally, a current extrapolation block (I-EXT) 58 may be placed between the current regulator 54 and the current observer 57 to derive the average synchronous frame currents at the future time point (k+1), i.e., $I_{dq,avg}(k+1)$, using the average synchronous reference frame currents at the present and/or a past instant in time. The average synchronous reference frame currents at the present and/or the past instant in time are provided by the current observer 57. For instance, the controller 50 may use linear extrapolation or higher-order extrapolation in the current extrapolation block 58 to derive the future value, i.e., $I_{dq,avg}(k+1)$, from one or more of the values of $I_{dq,avg}(k)$ and/or $I_{dq,avg}(k-n)$, i.e., using a past value of $I_{dq,avg}$.

FIG. 6 depicts an alternative embodiment of control logic 150L that includes an optional low-pass filter (LPF) block 61 downstream of a comparison logic block 59. In this embodiment, block 56 calculates and outputs each average synchronous frame current over the immediately-prior or previous sample period, i.e., $I_{dq,avg}(k-1)$, and also outputs the instantaneously-sampled synchronous frame currents, $I_{dq}(k)$. The instantaneously-sampled synchronous frame currents, $I_{dq}(k)$, are fed into the current observer 57 and into the comparison block 59. In the comparison block 59, the difference between $I_{dq}(k)$ and $I_{dq,avg}(k-1)$ is determined, i.e., the instantaneously-sampled current and the average current over the immediately-prior sample, with the difference represented by arrow $\Delta I^*_{dq}$. This difference value is processed via the LPF block 61 to minimize noise, e.g., by allowing the controller 50 to ignore delta values above a calibrated threshold.

A synchronous frame current adjustment (arrow $\Delta I_{dq}$) is added to the original current command (arrow $I^*_{dq}$) from the current command generation logic block 52, with the resultant value (arrow $I^{**}_{dq}$) transmitted to the current regulator block 54 along with the synchronous frame speed ($\omega_e$). The synchronous frame speed ($\omega_e$) is possibly derived as a time derivative (d/dt) of the synchronous reference frame position (θe) output from block 23, as will be appreciated. In the exemplary implementation of FIG. 6, the current regulator block 54 continues to control the instantaneous current, but the current generation command is modified to achieve a desired average current. The average current may also be used as a feedback variable to flux-linkage lookup tables of the controller 50 and/or to estimate motor torque.

The method 100, when implemented in the example powertrain system 10 of FIG. 1 or in other mobile or stationary systems having an AC electric machine, is thus intended to improve upon current estimation techniques by sampling phase currents and rotor position twice per sample period: at the end of the period, and again at the mid-point of the same period. The mid-point sample values could be estimated or extrapolated in some embodiments using speed and sample period information. The method 100 thus approximates synchronous frame currents as rectified sinusoid over one period. Controlling the average current over the last sample period induces delay in the current regulator block 54 of FIGS. 5 and 6, with various approaches to compensating for the induced delay set forth above. These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for controlling a polyphase electric machine, the method comprising:
    measuring phase currents of the polyphase electric machine at a starting point of a present sample period using a set of current sensors;
    determining the phase currents at a midpoint of a prior sample period, wherein the prior sample period occurs immediately prior to the present sample period;
    determining, via a controller, an angular position of a rotor of the polyphase electric machine at the starting point and at the midpoint;
    calculating synchronous reference frame currents of the polyphase electric machine at the starting point and the midpoint, via the controller, using the phase currents and the angular position determined at the starting point and at the midpoint;
    calculating average synchronous reference frame currents over a duration of the present sample period using the synchronous reference frame currents at the starting point and at the midpoint; and
    regulating torque and/or speed of the polyphase electric machine via the controller using the average synchronous reference frame currents.

2. The method of claim 1, wherein determining the phase currents at the midpoint of the prior sample period includes measuring the phase currents via the set of current sensors.

3. The method of claim 1, wherein determining the phase currents at the midpoint of the prior sample period includes extrapolating the phase currents via the controller.

4. The method of claim 1, wherein calculating average synchronous reference frame currents over a duration of the present sample period includes determining the average synchronous reference frame currents at a present or a future instant in time using a current observer of the controller.

5. The method of claim 4, wherein calculating average synchronous reference frame currents over the duration of the prior sample period includes extrapolating the average synchronous reference frame currents at the future instant in time using the average synchronous reference frame currents at the present and/or a past instant in time, wherein the average synchronous reference frame currents at the present and/or the past instant in time are provided by the current observer.

6. The method of claim 5, wherein extrapolating the average synchronous reference frame currents at the future instant in time is accomplished by the controller using linear extrapolation.

7. The method of claim 5, wherein extrapolating the average synchronous reference frame currents at the future instant in time is accomplished by the controller using second order or higher-order extrapolation.

8. The method of claim 1, the method further comprising:
    determining a difference between the average synchronous reference frame currents and the synchronous reference frame currents for the present sample period or the prior sample period;
    processing the difference through a low-pass filter to produce a filtered difference; and
    adjusting a set of synchronous reference frame current commands to the polyphase electric machine, via the controller in real-time, using the filtered difference.

9. The method of claim 1, wherein the polyphase electric machine includes a rotor coupled to a set of road wheels of a motor vehicle, and wherein regulating torque or speed of the polyphase electric machine includes controlling a corresponding torque or speed of the set of road wheels.

10. The method of claim 1, further comprising:
    registering, in logic of the controller, that the synchronous reference frame currents are shaped as a rectified sine wave between concurrent samples; and
    deriving the average synchronous reference frame currents over a duration of the present sample period by solving the following equations:

$$I_{x,pk1} = \frac{[I_x(k) + I_x(k-1)]}{2}$$

$$I_{x,pk-pk} = [I_{x,pk1} - I_x(k-0.5)]$$

$$I_{x,avg} = I_{x,pk1} - \frac{2I_{x,pk-pk}}{\pi}$$

where $I_{x,avg}$ is the average synchronous reference frame currents, $I_x(k)$, $I_x(k-0.5)$, and $I_x(k-1)$ are the synchronous reference frame currents at times (k), (k−0.5), and (k−1), and wherein time (k) is the present sample, time (k−0.5) is the midpoint sample, and (k−1) is the prior sample.

11. An electrical system comprising:
    an alternating current (AC), polyphase electric machine having phase windings and a rotor;
    a battery pack;
    a power inverter module (PIM) connected to the battery pack and the phase windings, and configured, responsive to pulse width modulation (PWM) signals, to output an AC voltage to the phase windings to energize the polyphase electric machine;

a set of current sensors connected to the phase windings and operable for measuring phase currents of the polyphase electric machine; and a controller configured to:
- receive measured phase currents from the set of current sensors at a starting point of a present sample period;
- determine the phase currents at a midpoint of a prior sample period, wherein the prior sample period occurs immediately prior to the present sample period;
- determine an angular position of the rotor at the starting point and at the midpoint;
- calculate synchronous reference frame currents of the polyphase electric machine at the starting point and the midpoint using the measured phase currents and using the angular position of the rotor;
- calculate average synchronous reference frame currents over a duration of the present sample period using the synchronous reference frame currents at the starting point and at the midpoint; and
- regulate operation of the polyphase electric machine using the average synchronous reference frame currents.

12. The electrical system of claim 11, wherein the controller is configured to determine the phase currents at the midpoint of the prior sample period by measuring the phase currents via the set of current sensors.

13. The electrical system of claim 11, wherein the controller is configured to determine the phase currents at the midpoint by extrapolating the phase currents.

14. The electrical system of claim 11, wherein the controller is configured to calculate the average synchronous reference frame currents over a duration of the present sample period by determining the average synchronous reference frame currents at a present or a future instant in time using a current observer.

15. The electrical system of claim 14, wherein the controller is configured to calculate the average synchronous reference frame currents over the duration of the present sample period by extrapolating the average synchronous reference frame currents at a present and/or a past instant in time using a current observer.

16. The electrical system of claim 15, wherein the controller is configured to extrapolate the average synchronous reference frame currents at the future instant in time using linear extrapolation.

17. The electrical system of claim 15, wherein the controller is configured to extrapolate the average synchronous reference frame currents at the future instant in time using second-order or higher order extrapolation.

18. The electrical system of claim 15, wherein the controller is configured to:
- determine a difference between the average synchronous reference frame currents and the synchronous frame currents for the present sample period or the prior sample period;
- process the difference through a low-pass filter to produce a filtered difference; and
- adjust synchronous reference frame current commands to the electric machine in real-time using the filtered difference.

19. The electrical system of claim 11, wherein the rotor is coupled to a set of road wheels of a motor vehicle, and the controller is configured to regulate the operation of the polyphase electric machine using the average synchronous reference frame currents by changing at least one of a torque and a speed of the polyphase electric machine.

20. The electrical system of claim 11, wherein the controller is configured to assume that the synchronous reference frame currents are shaped as a rectified sine wave between the present sample period and the prior sample period, and to calculate the average synchronous reference frame currents over a duration of the present sample period by solving the following equations:

$$I_{x,pk1} = \frac{[I_x(k) + I_x(k-1)]}{2}$$

$$I_{x,pk-pk} = [I_{x,pk1} - I_x(k-0.5)]$$

$$I_{x,avg} = I_{x,pk1} - \frac{2I_{x,pk-pk}}{\pi}$$

where $I_{x,avg}$ is the average synchronous reference frame currents, $I_x(k)$, $I_x(k-0.5)$, and $I_x(k-1)$ are the synchronous reference frame currents at times (k), (k−0.5), and (k−1), and wherein time (k) is the present sample, time (k−0.5) is the midpoint sample, and (k−1) is the prior sample.

* * * * *